United States Patent
Dawson et al.

(10) Patent No.: US 7,260,714 B2
(45) Date of Patent: Aug. 21, 2007

(54) SYSTEM AND METHOD FOR AUTHENTICATING WIRELESS COMPONENT

(75) Inventors: Thomas Patrick Dawson, Escondido, CA (US); David Desch, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 612 days.

(21) Appl. No.: 10/225,332

(22) Filed: Aug. 20, 2002

(65) Prior Publication Data
US 2004/0054897 A1    Mar. 18, 2004

(51) Int. Cl.
*H04L 29/14* (2006.01)
(52) U.S. Cl. .......... 713/155; 725/139; 725/141; 705/26; 710/303; 726/9; 726/20
(58) Field of Classification Search .......... 380/249, 380/250, 201, 229, 231; 705/52, 55, 57, 705/65, 67, 26; 713/155, 159; 725/81, 91, 725/103, 141, 146, 139; 710/303; 726/9, 726/20
See application file for complete search history.

(56) References Cited

U.S. PATENT DOCUMENTS

| | | | | |
|---|---|---|---|---|
| 5,544,321 A | | 8/1996 | Theimer et al. | 395/200.11 |
| 5,544,322 A | * | 8/1996 | Cheng et al. | 709/229 |
| 5,555,376 A | | 9/1996 | Theimer et al. | 395/200.09 |
| 5,574,860 A | | 11/1996 | Perlman et al. | 395/200.06 |
| 5,729,734 A | * | 3/1998 | Parker et al. | 707/9 |
| 5,987,153 A | * | 11/1999 | Chan et al. | 382/115 |
| 6,028,950 A | * | 2/2000 | Merjanian | 382/126 |
| 6,044,062 A | | 3/2000 | Brownrigg et al. | 370/238 |
| 6,151,628 A | | 11/2000 | Xu et al. | 709/225 |
| 6,202,158 B1 | * | 3/2001 | Urano et al. | 713/201 |
| 6,269,395 B1 | | 7/2001 | Blatherwick et al. | 709/219 |
| 6,272,129 B1 | | 8/2001 | Dynarski et al. | 370/356 |
| 6,275,934 B1 | * | 8/2001 | Novicov et al. | 713/168 |
| 6,353,599 B1 | * | 3/2002 | Bi et al. | 370/328 |
| 6,374,079 B1 | * | 4/2002 | Hsu | 455/11.1 |
| 6,480,101 B1 | * | 11/2002 | Kelly et al. | 340/10.2 |
| 6,608,911 B2 | * | 8/2003 | Lofgren et al. | 382/100 |
| 6,865,555 B2 | * | 3/2005 | Novak | 705/59 |
| 2002/0035699 A1 | | 3/2002 | Crosbie | 713/201 |
| 2002/0059530 A1 | | 5/2002 | Talvitie | 713/201 |
| 2002/0083341 A1 | | 6/2002 | Feuerstein et al. | 713/201 |
| 2002/0087887 A1 | | 7/2002 | Busam et al. | 713/201 |

FOREIGN PATENT DOCUMENTS

JP    001346258    12/2001

OTHER PUBLICATIONS

Schneier, Bruce, Applied Cryptography 1996, John Wiley & Sons, Inc., 2nd ed., p. 1.*

(Continued)

*Primary Examiner*—Emmanuel L. Moise
*Assistant Examiner*—Paul Callahan
(74) *Attorney, Agent, or Firm*—John L. Rogitz

(57) ABSTRACT

A wireless component is authenticated to an in-home wireless entertainment system server by simultaneously or near-simultaneously holding down buttons on the component and server and transmitting a component ID (or encryption results generated from the key) to the server. The server then indicates "authenticated", and the component can subsequently access the system using its ID.

22 Claims, 2 Drawing Sheets

OTHER PUBLICATIONS

Saini et al, "The BBC Select Decoder". Broadcasting Convention, 1992. IBC., International, pp. 410-413, 1992.*
Buffalo Technology Web page downloaded, Jun. 17, 2005.

AirStation One-Touch Secure System (AOSS™) White paper downloaded Jun. 17, 2005 bearing a date of Oct. 2004.

* cited by examiner

IN-HOME
WIRELESS ENTERTAINMENT
SYSTEM ARCHITECTURE

LOGIC FOR AUTHENTICATING NEW COMPONENT

ALTERNATE LOGIC

SYSTEM AND METHOD FOR AUTHENTICATING WIRELESS COMPONENT

FIELD OF THE INVENTION

The present invention relates generally to in-home wireless entertainment systems.

BACKGROUND OF THE INVENTION

In-home wireless entertainment systems can include a central server and various components that are in wireless communication with the server and that are dispersed throughout the house. For examples, TVs, digital video disk (DVD) recorders, VCRs, telephones, personal digital assistants (PDAs), appliances, and so on may all be linked in a wireless entertainment system.

The problem to which the present invention is directed is authenticating wireless components to access the system. In a wired system authentication is not generally a problem, since a component must be physically present in the home to communicate with the system. In a wireless system, however, it is possible for an eavesdropper or otherwise unauthorized person outside the home to access the system using the wireless network, which typically extends beyond the walls of the house.

Currently, wireless components are authenticated during "set up" using procedures that, for many consumers, can be confusing and complicated, and furthermore that might be less than secure. Recognizing this, the present invention has been provided.

SUMMARY OF THE INVENTION

A wireless home entertainment system includes a server that has a manipulable authentication element and one or more components in wireless communication with the server. Each component has manipulable authentication element. A person can cause the server to regard the component as being authenticated by manipulating the authentication elements.

In a preferred embodiment, the server includes logic for authenticating the component when the elements are manipulated simultaneously with each other. In an alternate embodiment, the server includes logic for authenticating the component when the elements are manipulated within a predetermined time threshold of each other. If desired, the server may include two authentication elements establishing respective levels of authentication for the component.

As set forth further below, the preferred component includes logic for transmitting a component identification in response to manipulating the authentication element on the component. Alternatively, the component can include logic for transmitting an encryption result generated at least in part using a component identification. The server may include means for indicating that the component is authenticated, such as by generating an audible or visual signal.

In another aspect, a method for authenticating, to a server, a component in wireless communication with the server includes depressing an authentication button on the server, and depressing an authentication button on the component to cause the component to transmit a message. The message also includes returning "authenticated" at the server in response to receiving the message only if the buttons are depressed simultaneously with each other or within a predetermined time period of each other.

In still another aspect, a logic component includes means, invokable by manipulating a first authentication element, for receiving an identification message transmitted in response to manipulation of a second authentication element. Also, the logic component includes means for returning "authentication" only if the elements have been manipulated together or within a predetermined period of each other.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
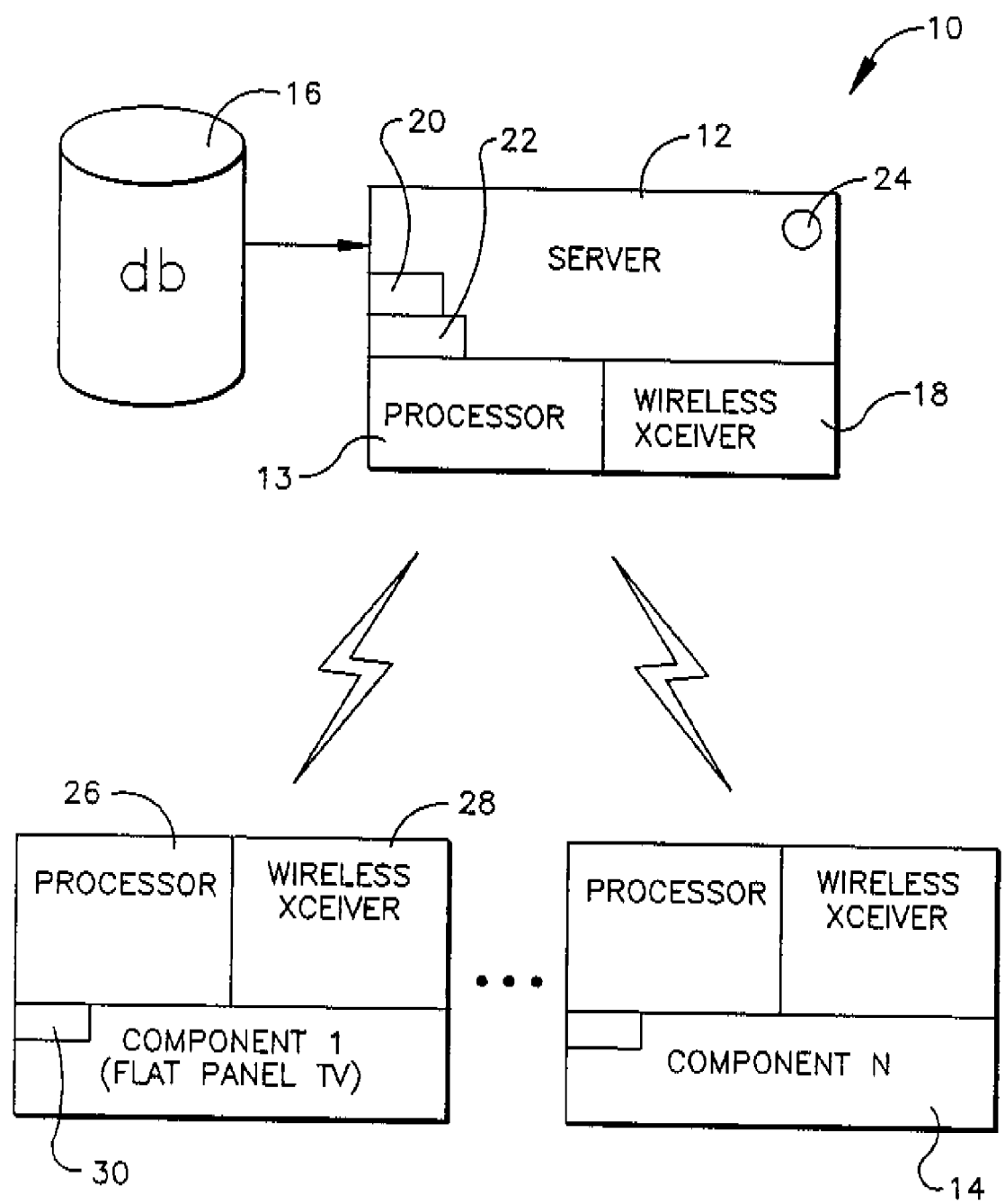
FIG. 1 is a block diagram of the system architecture of the present invention.

Referring initially to FIG. 1, a wireless home entertainment system is shown, generally designated 10, which includes a server 12 that can be implemented by any appropriate processor 13 and one or more components 14 that are in wireless communication with the server 12. For ease of illustration FIG. 1 shows two components 14, although more components 14 can be used. Non-limiting examples of embodiments of the components 14 are televisions, including portable flat-panel TVs, digital video disk (DVD) players, VCRs, telephones, personal digital assistants (PDAs), and household appliances.

In the particular embodiment shown in FIG. 1, the server 12 can access a database 16 of, e.g., audio-video content. In addition to the processor 13, the server 12 can also include a wireless transceiver 18, e.g., a code division multiple access (CDMA) transceiver. Other wireless communication principles, however, can be used, including other radiofrequency, infrared, and acoustic transmission principles.

In accordance with the present invention, the server 12 includes at least one and more preferably two human-manipulable authentication elements 20, 22. The elements 20, 22 may be implemented as buttons or toggles or switches or their functional equivalents. In any case, by "authentication element" is meant a manipulative device such as a button that does not function as a data entry device such as a keypad or keyboard, but instead is a single-purpose element that cannot be used for general data entry but that simply activates the server to function in accordance with the logic below. In the preferred non-limiting embodiment shown in FIG. 1, a first authentication element 20, when manipulated, indicates that the component 14 sought to be registered for authentication is to have unlimited system access. In contrast, a second authentication element 22, when manipulated, indicates that the component 14 sought to be registered for authentication is to have limited system access, e.g., access to only predetermined content or channels.

As also shown in FIG. 1, the server 12 may include an indication 24 that can be implemented by a light emitting diode (LED), a front panel display message, a message on a display screen associated with the server 12, etc. As discussed further below, the indication 24 is used to indicate successful registration for authentication of a component 14.

Turning to the specifics of a preferred non-limiting component 14, each component 14 may include a processor 26 and a wireless transceiver 28 for communicating with the server 12 and/or other components 14. The component processor 26 and server processor 13 may act alone or in concert with each other to execute the logic herein. Also, each component 14 includes at least one human-manipulable authentication element 30.

Figure 2:
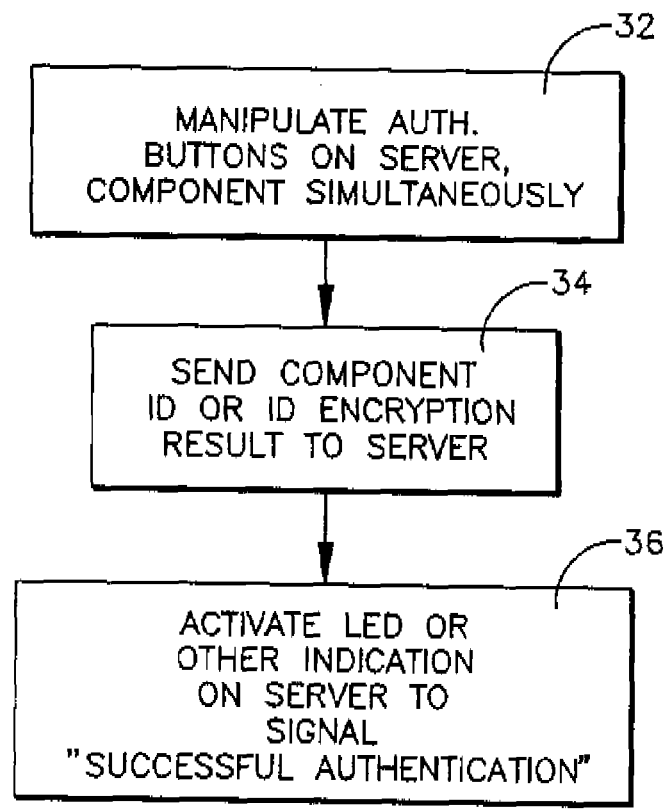
FIG. 2 is a flow chart showing the authentication logic.

FIG. 2 shows the authentication logic of the present invention, as can be embodied in software or hardware. FIG. 2 is in logic flow format for convenience of disclosure, but part or all of the logic can be implemented by state machines or other logic devices.

Commencing at block 32, a user wishing to register a component 14 for authentication (also generally referred to herein as "authenticating" the component) simultaneously manipulates the component authentication element 30 and one of the server authentication elements 20, 22 (depending on the level of system access to be granted the component 14). Manipulation of the server authentication element 20 causes the server to be configured to receive a message from the component 14. This message is transmitted at block 34 by the component 14 in response to manipulation of the component authentication element 30. When the server authentication element 20, 22 and component authentication element 30 are buttons, manipulation at block 32 can include depressing and holding down the buttons until the indication 30 is activated as described below.

In one preferred non-limiting embodiment, the message from the component 14 includes a unique identification associated with the component 14. This ID can be programmed into the component 14 at time of manufacture of either the processor 26 chip or component 14 manufacture or assembly, and can be input to a write-once read many type of device, such as a fusible link ROM. Alternatively, for even greater security the message transmitted by the component 14 can be an encryption result of the ID. For instance, the ID can be used as a seed for a key generation algorithm. In this case, the key, which may not be readable from any outside component, might not be transmitted, but rather only the results of an encryption algorithm that uses the key. This can be part of an overall authentication key exchange that might be implemented in accordance with public key/private key principles known in the art.

Proceeding to block 36, if the message is successfully read and processed by the server 12, the indication 24 can be activated to so inform the user. At this point, the component 14 has been authenticated to the server 12 to afford the component 14 the level of system 10 access indicated by the server authentication element 20, 22 that was manipulated. Subsequently, the component 14 can automatically communicate with the server 12 in accordance with session wireless authentication procedures known in the art.

Figure 3:
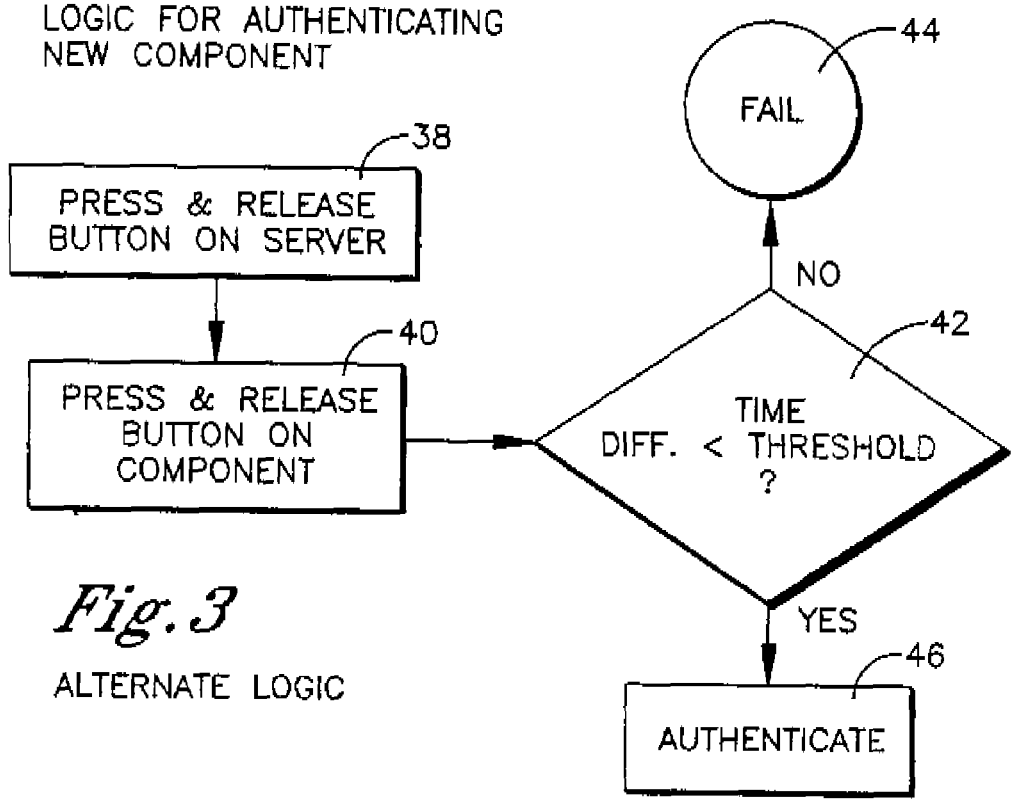
FIG. 3 is a flow chart showing alternate authentication logic.

FIG. 3 shows that in an alternate embodiment, the server authentication element and component authentication element need not be manipulated simultaneously with each other, but rather can be manipulated within a predetermined time period of each other, e.g., a second or two. Accordingly, at block 38 the server authentication element 20, 22 is manipulated and released. Then, at block 40 the component authentication element 30 is manipulated and released. At decision diamond 42 it is determined whether the manipulations occurred within the predetermined period and if not, "fail" is returned at state 44. Otherwise, "authenticate" is indicated at block 46. In this embodiment, clocks in the component 14/server 12 can be synchronized.

While the particular SYSTEM AND METHOD FOR AUTHENTICATING WIRELESS COMPONENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A wireless home entertainment system, comprising:
    at least one server having at least one manipulable authentication element thereon; and
    at least one component in wireless communication with the server and being associated with at least one manipulable authentication element, at least the authentication element on the server being a physically depressible button and not being a general purpose data entry element, whereby a person can cause the sewer to regard the component as being authenticated by manipulating the authentication elements.

2. The system of claim 1, wherein the server includes logic for authenticating the component when the elements are manipulated simultaneously with each other.

3. The system of claim 1, wherein the server includes logic for authenticating the component when the elements are manipulated within a predetermined time threshold of each other.

4. The system of claim 1, comprising at least two authentication elements on the server for establishing respective levels of authentication for the component.

5. The system of claim 1, wherein the elements are buttons.

6. The system of claim 1, wherein the component includes logic for transmitting at least one component identification in response to manipulating the authentication element on the component.

7. The system of claim 1, wherein the component includes logic for transmitting at least one encryption result generated at least in part using a component identification, the encryption result being transmitted in response to manipulating the authentication element on the component.

8. The system of claim 1, wherein the server further comprises means for indicating that the component is authenticated.

9. The system of claim 8, wherein the means for indicating generates an audible or visual signal.

10. A method for authenticating a component in wireless communication with a server to the server, comprising:
physically depressing an authentication button on the server, the authentication button not being a general purpose data entry button;
operating an authentication button on the component to cause the component to transmit a message; and
returning "authenticated" at the server in response to receiving the message only if the buttons are depressed within a predetermined time period of each other.

11. The method of claim 10, wherein the server includes at least two authentication elements representing respective levels of authentication.

12. The method of claim 10, comprising transmitting at least one component identification in response to manipulating the authentication button on the component.

13. The method of claim 10, comprising transmitting at least one encryption result generated at least in part using a component identification, the encryption result being transmitted in response to manipulating the authentication button on the component.

14. The method of claim 10, comprising providing at least one visual or audible indication of successful authentication of the component.

15. A logic component embodied in a computer-readable medium, the medium being readable by a computer to execute steps, the logic component comprising:
means, invokable by a user manipulating a first authentication element, for receiving an identification message transmitted in response to manipulation by a user of a second authentication element, at least the first authentication element being a physically movable button, toggle, or switch that is not a general purpose data entry element; and
means for returning "authentication" only if the elements have been manipulated within a predetermined period of each other.

16. The logic component of claim 15, comprising a server supporting the first element, a component supporting the second element, and a wireless communication path therebetween.

17. The logic component of claim 16. comprising at least two authentication elements on the server for establishing respective levels of authentication for the component.

18. The logic component of claim 15, wherein the elements are buttons.

19. The logic component of claim 16, wherein the message includes at least one component identification.

20. The logic component of claim 16, wherein the message includes at least one encryption result generated at least in part using a component identification.

21. The logic component of claim 16, wherein the server further comprises means for indicating that the component is authenticated.

22. The logic component of claim 21, wherein the means for indicating generates an audible or visual signal.

* * * * *

UNITED STATES PATENT AND TRADEMARK OFFICE
CERTIFICATE OF CORRECTION

| | | |
|---|---|---|
| PATENT NO. | : 7,260,714 B2 | Page 1 of 1 |
| APPLICATION NO. | : 10/225332 | |
| DATED | : August 21, 2007 | |
| INVENTOR(S) | : Dawson | |

It is certified that error appears in the above-identified patent and that said Letters Patent is hereby corrected as shown below:

In the Claims

In Claim 1, column 4, line 40, "sewer" should read - server -.

Signed and Sealed this
Third Day of March, 2015

Michelle K. Lee
*Deputy Director of the United States Patent and Trademark Office*